United States Patent [19]

Dragotin

[11] Patent Number: 5,003,561
[45] Date of Patent: Mar. 26, 1991

[54] PROCESS FOR THE RECEPTION OF A BINARY DIGITAL SIGNAL

[75] Inventor: Alexander Dragotin, Puchheim, Fed. Rep. of Germany

[73] Assignee: Siemens Aktiengesellschaft, Berlin and Munich, Fed. Rep. of Germany

[21] Appl. No.: 417,150

[22] Filed: Oct. 4, 1989

[30] Foreign Application Priority Data

Oct. 13, 1988 [EP] European Pat. Off. ............ 88117055

[51] Int. Cl.$^5$ .............................................. H04L 7/00
[52] U.S. Cl. ...................................... 375/119; 328/109
[58] Field of Search ............... 375/118, 119, 106, 110, 375/111; 328/109

[56] References Cited

U.S. PATENT DOCUMENTS

| | | | |
|---|---|---|---|
| 3,593,160 | 7/1971 | Moore | 375/111 |
| 3,819,853 | 6/1974 | Stein | 375/110 |
| 3,961,138 | 6/1976 | Fellinger | 375/111 |
| 4,288,874 | 9/1981 | Yamada | 375/119 |
| 4,385,395 | 5/1983 | Tanaka et al. | 375/110 |
| 4,780,891 | 10/1988 | Guérin et al. | 375/111 |

FOREIGN PATENT DOCUMENTS

| | | |
|---|---|---|
| 0168330 | 7/1985 | European Pat. Off. |
| 0260632 | 9/1987 | European Pat. Off. |
| 1221671 | 7/1966 | Fed. Rep. of Germany |
| 3441501 | 5/1986 | Fed. Rep. of Germany |
| 2143407 | 2/1985 | United Kingdom |

OTHER PUBLICATIONS

PCT International Publication WO 88/05236, dated Jul. 14, 1988.

*Primary Examiner*—Benedict V. Safourek
*Assistant Examiner*—Marianne Huseman
*Attorney, Agent, or Firm*—Jeffrey P. Morris; John F. Moran

[57] ABSTRACT

A process for receiving a binary digital signal by a method for the reception of a binary digital signal, which may also have phase shifts, with a supplied clock that may have any desired phase position with respect to the digital signal and may deviate somewhat in frequency from the bit sequence frequency of the digital signal. From the clock (T1) there is formed over a delay chain (7-13, 52-55) a series of clocks (T2-T12), which have approximately equal phase intervals. Short pulses (I11-I110) are derived from the clocks (T1-T12). Upon the arrival of each edge of a digital signal (D1) that has been selected as the effective edge, there is derived a read pulse (I21) which may also be delayed (I2x), with which the presence of pulses (I11-I110) may be determined through AND gates (20-25, 60-63). Through SR flip-flops (26-31, 64-67) and AND gates (32-37, 68-71), clocks (F1-F10) selected with the pulses (I11-I110) that are present are switched through and OR-linked (38) for use as an input clock (Te). The total delay of this process step is, if necessary, dimensioned in such a way by delaying the read pulse (I2x) that the effective edge of the input clock (Te) occurs always one half clock period after the effective edge of the digital signal (D1). An application of the invention is in synchronous switching matrices and in block switching.

4 Claims, 5 Drawing Sheets

PROCESS FOR THE RECEPTION OF A BINARY DIGITAL SIGNAL

BACKGROUND OF THE INVENTION

1. Field of the Invention

This invention relates to a process for the reception of a binary digital signal, which may also exhibit phase shifts, and it relates, more particularly, to an arrangement including elements having an approximately constant propagation delay, operating at a clock whose frequency is equal to or plesiochronous with the bit rate of the digital signal and whose phase difference is selected arbitrarily with respect to the digital signal.

2. Description of the Prior Art

A circuit arrangement for the regeneration and synchronization of a digital signal, which compensates for the phase oscillations of the incoming signal bits, is already known from German patent document DE 34 31 501 A1. For that purpose, it contains a series circuit consisting of a controllable delay line coupled to a delay control unit, to which the controllable delay line is connected through address lines. The decision logic is supplied over a clock line with a system clock whose frequency corresponds to the bit rate of the digital signal that is to be regenerated and synchronized.

In an ideal binary digital signal, the rising and falling edges of each binary digit lie within a fixed pattern, which is determined by the period of the clock frequency. Any deviation of the edges from this pattern is referred to as jitter. Within defined limits, this jitter must not result in information errors when the signal is received.

Two different kinds of jitter can be distinguished. The first consists of time deviations of two successive edges from the prescribed raster, the second of slowly developing phase shifts, which can lead to a time shift of more than one period.

FIG. 1 shows a period T of the clock frequency, with a permissible jitter range $-x$ and $+x$ for the pulse transitions or edges. For a delay-free phase equalization, only one edge can be the reference point for the arrival of a new pulse of the digital signal. If this occurs, in accordance with FIG. 2, at the time t2, then a half-period T/2 of the clock frequency must elapse before the pulse is received at time t4. The deviations that can occur in the determination of the time T/2 are taken into account by the time intervals $+\Delta y$ and $-\Delta y$.

If the edge arrives at time t3, then reception is possible only when $$T/2 + \Delta y < T - 2x. \tag{1}$$

On the other hand, if the edge arrives at time t1, then perfect reception requires that $$T/2 - \Delta y > 2x. \tag{2}$$

SUMMARY OF THE INVENTION

An object of the present invention is to provide a process for the inertia-free reception of a binary digital signal with a changing phase position.

Using a process of the type described in the introduction as a basis, the invention accomplishes the foregoing purpose by a process step set wherein a binary digital signal subject to phase shifts.

An edge that serves to derive pulses is also referred to as an effective edge.

The deviation $\Delta y$ depends first of all on the basic or additional delay $\Delta t1$, which can be expressed as the time interval T/n, where n is the number n of the pulses. It is also dependent on the accuracy $\delta$ with which the time interval T/2 can be measured. This can be accomplished over a fixed number of gate delays. The formula for the deviation is then $$\Delta y = T/n - \delta - T/2 \tag{3}$$

By combining (1), (2) and (3), we obtain:

$$x = T\frac{n(1-\delta) - 2}{4n} \tag{4}$$

The process according to the invention can be used in synchronously operating systems. In this case a perfect reception of the data signals is made possible by the compensation of any desired phase position. This process has the effect of clock recovery.

Another possible application is a block switching, in which a synchronization of the block frequencies is unnecessary. The process can be used in order to compensate a phase that is continually changing because of differences in the clock frequency. However, it can also be used when the various information blocks have different phase positions.

If this process is to be carried out in an integrated circuit in which, due to sample dispersions and operating tolerances, the basic or additional delays and the delays in all the other elements lie within a defined range, there must be a compensation of the change in the delay of the elements, so that the effective edge of the input clock is delayed by about half a clock period T/2 with respect to the effective edge of the digital signal.

A process for receiving a binary digital signal (D1), which may also have phase shifts, using a clock signal (T1), whose frequency is plesiochronous with or equal to the bit rate of the digital signal (D1) and whose phase difference is selected arbitrarily with respect to the digital signal (D1), by applying the clock signal to serially connected elements with approximately constant delays; by deriving a series of n+p+1 pulses (T2 to Tn+p+1) from the clock (T1), through transmission over n (n>3) principal delay units (G) with approximately equal principal delays ($\Delta t1$) and a total principal delay of at least one clock period and over p additional delay units (Z) with additional delays equal to the principal delays ($\Delta t1$); by deriving from the rising and/or falling edges of those pulses (T1 to Tn+p+1), with a duration that is greater than a principal delay ($\Delta t1$) and, for large values of n, is big enough so that logic elements can be driven through them from pulses (I11 to I1n) which are short with respect to the clock period; by deriving read pulses (I21) and reset pulses (R1) from the rising and/or falling edges of the digital signal (D1), with a duration that is small compared with a clock period, but large enough so that logic elements can be driven through them, by storing during the occurrence of a read pulse (I21) the simultaneously occurring pulse or pulses (e.g., I15) of the sequence (I11–I1n), after the memory elements have been cleared immediately before with the resetting pulses (RI), switching through a clock (e.g., F5) for every memory element that has stored a pulse (e.g., I15) of the sequence (I11–I110), which originates from a delay element that is downstream of the delay element from whose clock the stored pulse was derived; by blocking a clock by every memory element that has not stored a pulse, blocks a clock; by OR-linking the clocks that have been switched through (e.g., F5) and blocked; by selecting the clock or clocks that has/have been switched through (e.g., F5) from the principal and additional delay units (G, Z) that are connected downstream in each case in such a manner that the rising and/or falling edge of the OR-linked input clock (Te) formed from the clocks that have been switched through and blocked arrives delayed by about half a clock period with respect to the edge of the digital signal (D1); and by reading the digital signal (D1) in (D2) responsive to the rising or falling edge of the input clock (Te).

BRIEF DESCRIPTION OF THE DRAWINGS

Features of the invention and additional objects of the invention will be more readily appreciated and better understood b y reference to the following detailed description which should be considered in conjunction with the drawing.

DETAILED DESCRIPTION

Figure 1:
FIG. 1 provides an explanation of jitter.
Figure 2:
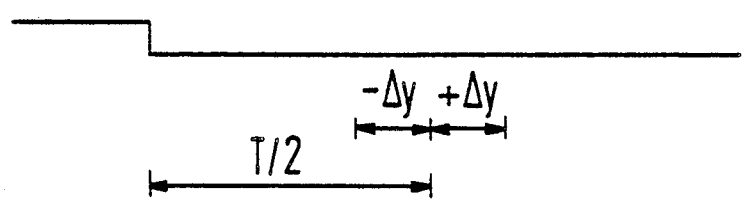
FIG. 2 shows a moment at which a pulse is received.
Figure 3:
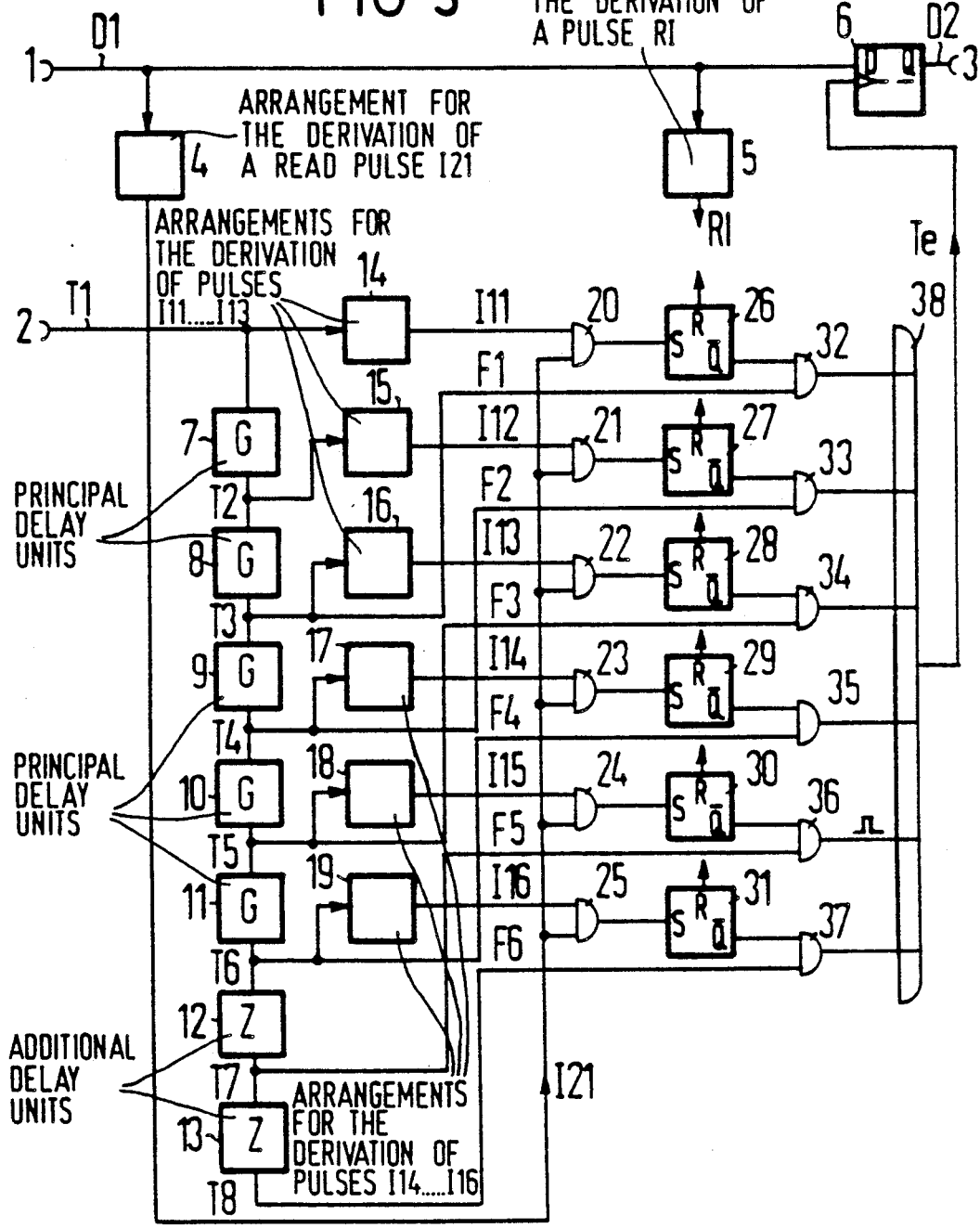
FIG. 3 shows a basic circuit diagram of an illustrative embodiment for carrying out the process according to the invention for constant delays.

FIG. 3 shows a basic diagram of an arrangement for the implementation of the process with constant delays. The arrangement includes a D flip-flop 6, an arrangement 4 for the derivation of a short read pulse I21 and an arrangement 5 for the derivation of a reset pulse RI from the effective edge of a digital signal D1, principal delay units "G" 7-11 additional delay units "Z" 12 and 13, arrangements 14-19 for the derivation of the pulses I11-I16, AND gates 20-25 and 32-37, SR flip-flops 26-31 and an OR gate 38. The arrangements 4 and 5, and 14-19 may be implemented by a circuit such as that labelled "B" in FIG. 5.

An input 2 receives a clock frequency T1 which may deviate slightly from the bit sequence frequency of a digital signal D1 at the input 1 and may have an arbitrary phase position with respect to it.

The digital signal D1 is fed to the D input of the D flip-flop 6. The rising edges of the digital signal D1 are the effective edges. In the arrangement 4, read pulses I21 are derived from these edges. The duration of these pulses is small compared to a clock period T, but large enough so that logic elements can be driven by them. In the arrangement 5 further reset pulses RI of corresponding duration are derived from the effective edges of the digital signal D1 and fed to the R inputs of all the SR flip-flops 26-31. The clock signal T1 is fed into the delay line of elements 7-13, which comprises principal delays elements "G" 7-11, and additional delay units "Z" 12 and 13. The principal and additional delays ιt1 are equal to T/6. Each principal delay unit "G" drives from the effective edges of the clock signals T1 to T6 short pulses I11 to I16, whose duration is larger than the principal delay ιt1 and is large enough, even for big values of n, so that logic elements can be driven by them. The pulses I11-I16 are each applied to one input of the AND gates 20-25. The second inputs are connected with the output of the arrangement 4. When a read pulse I21 arrives from this output, then the pulse or pulses that are already present is/are switched through from the sequence I11-I16 and arrive at the setting input S of the SR flip-flops 26-31, which have been reset with a resetting pulse shortly before. The Q outputs of these RS flip-flops 26-31 are connected to the first inputs of the AND gates 32-37, whose second inputs are connected with clock outputs of the principal delay units "G" 8-11 and the additional delay units "Z" 12 and 13. The pulses T3-T8 have been renamed F1-F6 for further processing. The outputs of the AND gates 32-37 are wired to the inputs of the OR gate 38 and its output is wired in turn to the clock input of the D flip-flop 6.

All the elements in this arrangement have propagation delays. Due to the time interval between the arrival of the signals at the two inputs of the AND gates 32-37, the delay between the effective edge of the digital signal D1 and that of the input clock Te at the clock input of the D flip-flop 6 can be set in such a manner that it is equal to T/2 for each newly received pulse of the digital signal D1. The emitted digital signal D2 thus consists only of correctly scanned pulses.

Figure 4:
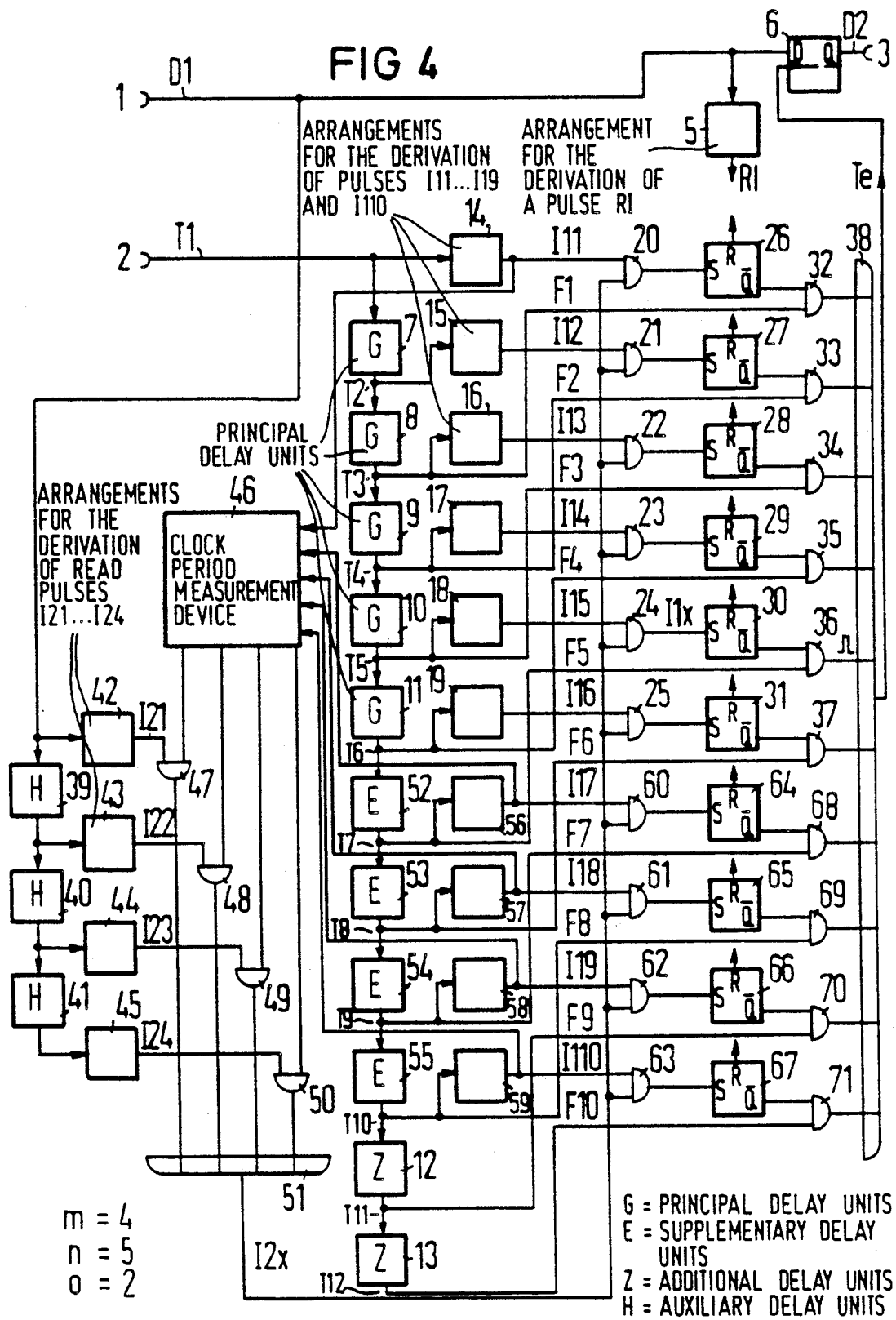
FIG. 4 provides a basic circuit diagram of an illustrative embodiment for carrying out the process according to the invention for fluctuating delays.

FIG. 4 shows a basic diagram of an arrangement for the implementation of the process with fluctuating delays. The arrangement comprises all the elements of the arrangement according to FIG. 3. In addition, it includes auxiliary delay units "H" 39 -41, arrangements 42-45 for the derivation of read pulses I21-I24, a clock period measurement device 46, AND gates 47-50, 60-63 and 68-71, supplementary delay units "E" 52-55, arrangements 56-59 for the derivation of pulses I17-I110, SR flip-flops 64 -67 and an OR gate 51.

For the maximum delay ιt1, the principal delay units "G" are sufficient. For the minimum delay, the number of supplementary delay lines "E" must be chosen in such a manner that a further delay, equal to a clock period T takes place along the delay units of these two kinds.

Since, in spite of the fluctuating delay, the delay between the effective edge of the digital signal D1 and that of the input clock Te is to be equal to half a clock period T/2, an adjustable delay of the read command is introduced in the signal processing path. This is achieved by a gradual delay of the digital signal D1 so that a sequence of read pulses I21-I24 is derived over the auxiliary delay elements "H" 39-41 with auxiliary delays ι t2 and the arrangements 42-45.

When a pulse I11 has been derived in the arrangement 14, the clock period measurement device 46 determines which of the arrangements 56-59 has a pulse at its output at that time. According to the result in each case, either a read pulse I21 is switched through over the AND gate 47, or a read pulse I22, I23 or I24 which is delayed with respect to the read pulse I21 is switched through one of the AND gates 48-50, as a read pulse I2x. This pulse then arrives through the OR gate 51 at the second inputs of the AND gates 20-25 and 60-63. The process then proceeds as has already been described with respect to FIG. 3. The arrangements 42-45 and 56-59 may be implemented by the circuit labelled "B" in FIG. 5.

Figure 5:
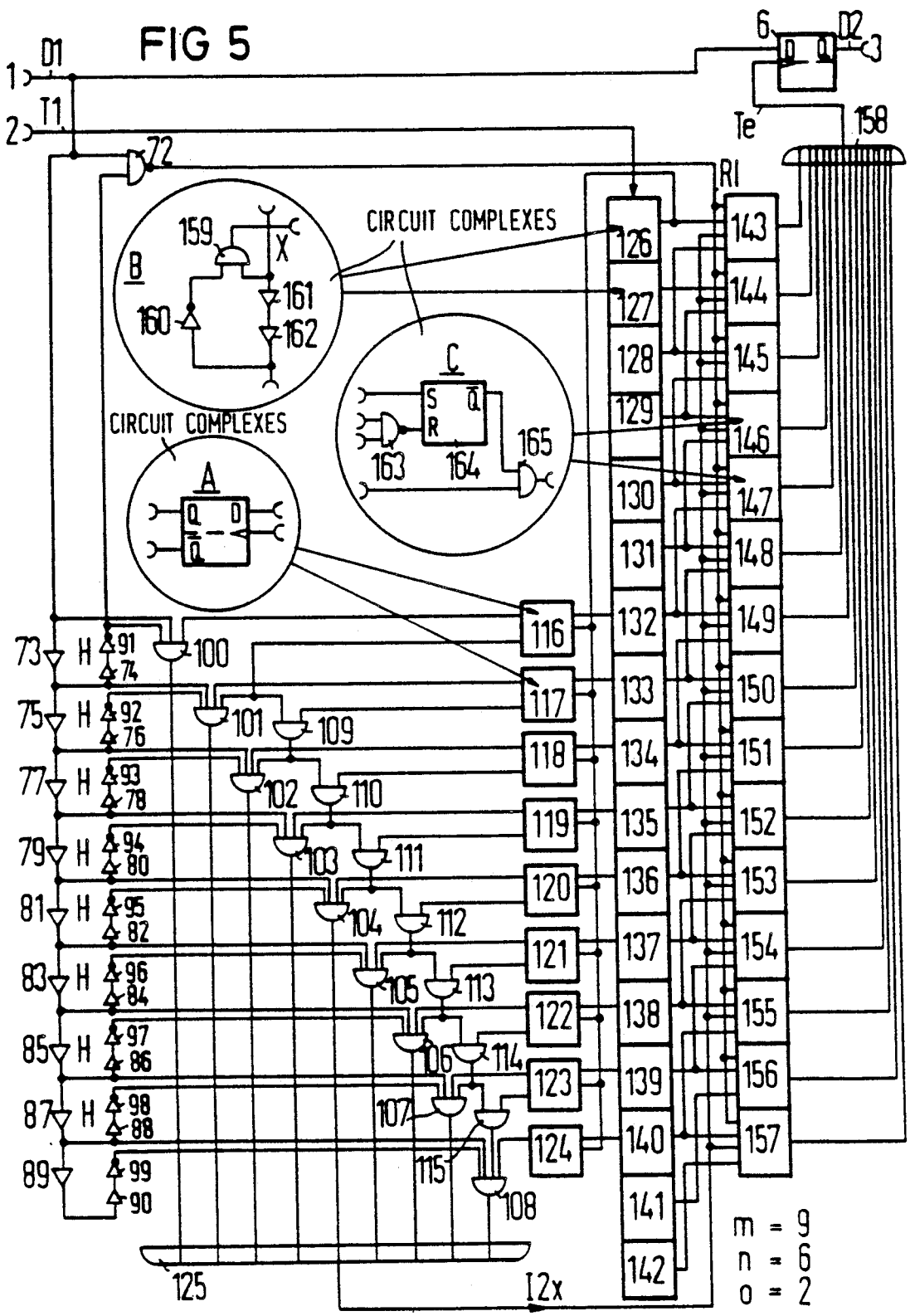
FIG. 5 depicts a circuit diagram of an actual illustrative arrangement in accordance with FIG. 4.

FIG. 5 shows a practical arrangement using the basic circuit diagram of FIG. 4. The arrangement comprises a NAND gate 72, non-inverting gate elements 73–90 and inverting gate elements 91 –99, each of which is used for time delay, AND gates 100–115, D flip-flops "A" 116–124, an OR gate 125, circuit complexes "B" 126 –142, circuit complexes "C" 143–157, an OR gate 158 and the D flip-flop 6.

The circuit complex "B" comprises an AND gate 159, an inverting gate element 160 for delay and non-inverting gate elements 161 and 162 for delay. The lower terminal is connected to the upper terminal (not shown) of the subsequent circuit complex "B" 126. The circuit complexes 126–142 are connected with one another correspondingly.

The circuit complex "C" comprises a NAND gate 163, an SR flip-flop 164 and an AND gate 165.

In the D flip-flop "A" and the circuit complexes "B" and "C", the terminals in the circuit diagram are arranged geometrically in the same manner as in the "black boxes" 116–124, 126–142 and 143–157.

The circuit complexes "B" and "C" operate like the elements 7 –37 and 52–71 in FIG. 4. The gates 73, 75, 77, 79, 81, 83, 85 and 87 form an auxiliary delay chain with eight members. The non-inverting gates 74, 76, 78, 80, 82, 84, 86, 88 and 90 and the inverting gates 91–99, when combined with the AND gates 100–108, each produce with respect to its two left-hand inputs an arrangement for the generation of a read pulse. In the D flip-flops "A" 116–124, the pulse Ilx that is present in the circuit complexes "B" 132 –140 at the time of a pulse I11—or two such pulses—is stored at a terminal X of a circuit complex "B".

Each of the AND gates 100–108 which receives both a pulse Ilx and a read pulse I2x emits a signal to the OR gate 125, at whose output the read pulse I2x appears with the desired delay. The NAND gate 72 supplies a reset pulse RI for all the SR flip-flops 164.

The AND gates 109–115 serve to suppress any second pulse Ilx that may have been stored. If, for example, the Q outputs of the D flip-flops "A" 116 and 117 are in the logic state "1", then the logic state at the output of the AND gate 109 is also "1" and a logic state "1" can occur at the output of the AND gate 102. Now if a logic state "0" occurs at the Q output of the D flip-flop "A", then corresponding states must occur at the outputs of the AND gates 110–115.

Figure 6:
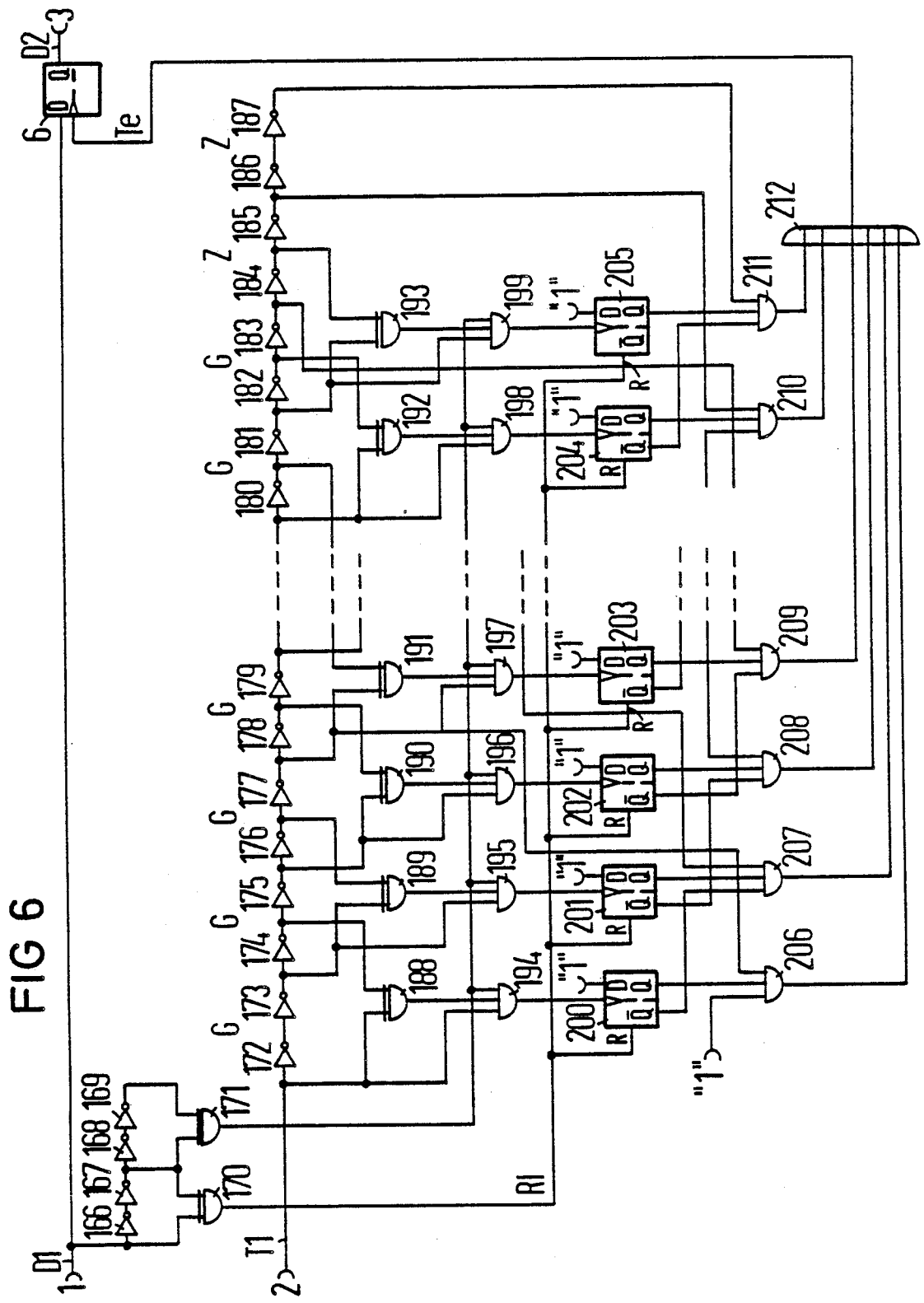
FIG. 6 shows a circuit diagram of a practical illustrative embodiment in accordance with FIG. 3.

FIG. 6 shows a practical embodiment of the arrangement according to FIG. 3. The arrangement contains inverting gate elements 166–169 and 172–187 for delay, exclusive OR gates 170 and 171 and 188–193, AND gates 194–199 and 206–211, D flip-flops 200–205, an OR gate 212 and the D flip-flop 6 already shown in FIG. 3.

The digital signal D1 present at input 1 is read in the D flip-flop 6 with the input pulse Te and received at the output 3 as a digital signal D2.

The remainder of the circuit is used to derive the input pulse Te from the clock T1 that is present at the input 2. For this purpose, the clock signal T1 is fed into a delay chain 172–187 with sixteen members, in which every two inverting gate elements form a delay element. Their number is chosen in such a manner that the clock signal at the output of the inverting gate element 183 is always delayed by one clock period with respect to the clock signal T1 at the input 2, when the delay time per gate element is at a minimum. The exclusive OR gates 188–193 emit pulses with a width equal to three times the delay time of a gate element, if the state of the delay chain 172–187 changes in its range. These pulses cover, step by step, the phase range from 0° to 360°.

The exclusive OR gate 170, in conjunction with the inverting gate elements 166 and 167, emits a resetting pulse RI, which resets all the D flip-flops 200–205 for each change in the state of the digital signal D1. As a result, all the Q outputs, the outputs of the AND gates 206–211 and the output of the OR gate 212 are in the logic state "0".

The inverting gate elements 168 and 169 and the exclusive OR gate 171 emit a read pulse that is delayed with respect to the resetting pulse RI. From the AND gates 194–199, the exclusive OR gate receives at its output a logic state of "1", in which case the same state occurs at the input of the respective delay element if the read pulse is present. In addition, a logic state of "1" must be present at the output of the respective exclusive OR gate from the exclusive OR gates 188–193, which is true only when there is a logic state of "0" at the output of the third inverting gate element following the input of the delay element.

If the output of one or more of the AND gates 194–199 switches to the logic state "1", then the Q output of the next D flip-flop of the D flip-flops 200–205 also receives the logic state "1". The next AND gate of the AND gates 206–211 receives at its output a logic state of "1", if not only the Q output of the respective D flip-flop but also the Q output of the preceding D flip-flop has the same state. In addition, the logic state at the output of the next delay element after that must have the logic state "1". The outputs of AND gates 206–211 will be linked at OR gate 212. If two of the AND gates 206–211 have a logic state "1"0 at the output, and are based on clock pulses which shift with respect to each other by a clock period, that causes no problem.

There has thus been shown and described novel digital signal receivers and their method of operation which fulfill all the objects and advantages sought therefor. Many changes, modifications, variations and other uses and applications of the subject invention will, however, become apparent to those skilled in the art after considering this specification and the accompanying drawing which disclose the preferred embodiments thereof. All such changes, modifications, variations and other uses and applications which do not depart from the spirit and scope of the invention are deemed to be covered by the invention which is limited only by the claims which follow.

I claim:

1. A process for receiving a binary digital signal, which may also have phase shifts, using a clock signal, whose frequency is plesiochronous with or equal to the bit rate of the digital signal and whose phase difference is selected arbitrarily with respect to the digital signal, the process comprising the steps of:

applying the clock signal to serially connected delay elements with approximately constant delays;

deriving a series of $n+p+1$ clock pulses from the clock signal, through transmission over n principal ones of said delay elements with approximately equal principal delays and a total principal delay of at least one clock period and over p additional ones of said delay elements with additional delays equal to the principal delays ($t1$), where n is an integer greater than three and p is an integer greater than or equal to zero;

deriving a sequence of shorter pulses from the rising and/or falling edges of the clock pulses, each of said shorter pulses having a duration that is greater than a principal delay and, given large values of n, is big enough so that logic elements can be driven by said shorter pulses which are short with respect to the clock period;

deriving read pulses and reset pulses from the rising and/or falling edges of the digital signal, with a duration that is small compared with a clock period, but large enough so that logic elements can be driven by said read pulses and said reset pulses;

storing in memory elements during the occurrence of a read pulse a simultaneously occurring shorter pulse or pulses of the sequence of shorter pulses, after the memory elements have been cleared immediately before with the resetting pulses;

switching through a clock for every memory element that has stored a pulse of the sequence of shorter pulses, which originates from a delay element that is downstream of the delay element from whose clock the stored pulse was derived;

blocking a clock from every memory element that has not stored a pulse;

OR-linking the clocks that have been switched through and blocked to from an OR-linked input clock;

selecting the clock or clocks that has/have been switched through from the principal and additional delay elements that are connected downstream in each case in such a manner that the rising and/or falling edge of the OR-linked input clock formed from the clocks that have been switched through and blocked arrives delayed by about half a clock period with respect to the edge of the digital signal; and reading the digital signal as an output digital signal responsive to the rising or falling edge of the input clock.

2. A process according to claim 1 for implementation in an integrated circuit in which, due to tolerances, the principal or additional delays and the delays in all the other elements in a defined area fluctuate, wherein that the read pulse remains underlayed in the event of maximum principal, additional and other delay and that the read pulse (I21) in all other cases is delayed in such a manner that the effective edge of the input clock (Te) arrives delayed by half a clock period with respect to the edge of the digital signal, regardless of the value of the various delays.

3. A process according to claim 2, wherein the supplementary delay elements are introduced between the principal delay elements and the additional delay elements, the number of which (m) corresponds to the ratio $(n+m+1)/(n+1)$, rounded off to a whole number, of the maximum delay to the minimum delay, where m is a positive integer, that from the digital signal, by transmission over auxiliary delay elements, the number of which is $m-1$ and which have an auxiliary delay equal to half of the principal delay, there is derived a sequence of read pulses, that the first pulse in the direction of the flow derived from a clock at the output of a supplementary delay element, which occurs precisely when the next pulse is derived at the input of the first principal delay element is identified, that the identified pulse is stored, that any other pulses that occur at the same time are suppressed, that the stored pulse switches through the read pulse that produces the correct delay.

4. An arrangement for the implementation of the process according to claim 3 with a digital signal having a bit rate of about 140 Mbit/s, wherein delays between about 1 ns and about 7.1 ns, there are provided six principal delay elements (B), nine supplementary delay elements and two additional delay elements.

* * * * *